US012212188B2

(12) United States Patent
Fischer et al.

(10) Patent No.: US 12,212,188 B2
(45) Date of Patent: Jan. 28, 2025

(54) ELECTRIC MACHINE WITH A FIXATION OF MULTIPLE ROTOR LAMINATIONS TO A ROTOR SHAFT, SAID FIXATION ALLOWING AN AXIAL TOLERANCE COMPENSATION

(71) Applicant: Schaeffler Technologies AG & Co. KG, Herzogenaurach (DE)

(72) Inventors: Alexandre Fischer, Strasbourg (FR); Thomas Fritz, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 333 days.

(21) Appl. No.: 17/613,100

(22) PCT Filed: Apr. 30, 2020

(86) PCT No.: PCT/DE2020/100363
§ 371 (c)(1),
(2) Date: Nov. 22, 2021

(87) PCT Pub. No.: WO2020/233739
PCT Pub. Date: Nov. 26, 2020

(65) Prior Publication Data
US 2022/0216754 A1    Jul. 7, 2022

(30) Foreign Application Priority Data

May 22, 2019    (DE) .................... 10 2019 113 596.6

(51) Int. Cl.
*H02K 1/28*    (2006.01)
*H02K 1/274*    (2022.01)
(Continued)

(52) U.S. Cl.
CPC .............. *H02K 1/28* (2013.01); *H02K 1/274* (2013.01); *H02K 7/003* (2013.01); *H02K 7/14* (2013.01)

(58) Field of Classification Search
CPC    H02K 1/28; H02K 1/274; H02K 1/27; H02K 7/003; H02K 7/14
(Continued)

(56) References Cited

U.S. PATENT DOCUMENTS

2012/0299404 A1    11/2012    Yamamoto et al.
2017/0005545 A1*    1/2017    Kaneko ................... H02K 9/10
(Continued)

FOREIGN PATENT DOCUMENTS

CN    102714438 A    10/2012
CN    104584389 A    4/2015
(Continued)

OTHER PUBLICATIONS

Machine translation of Kubota JP2013158076,,Aug. 15, 2013 (Year: 2013).*

*Primary Examiner* — Terrance L Kenerly
(74) *Attorney, Agent, or Firm* — Volpe Koenig

(57) ABSTRACT

An electric machine for driving a motor vehicle includes a rotor having a central rotor shaft and a laminated core which is made of multiple rotor laminations and is fixed to the rotor shaft. The laminated core is contacted on at least one axial side by an end lamination which produces a tolerance compensation, said end lamination being supported by a securing ring pressed onto the rotor shaft.

14 Claims, 3 Drawing Sheets

(51) Int. Cl.
  *H02K 7/00* (2006.01)
  *H02K 7/14* (2006.01)
(58) Field of Classification Search
  USPC ...................................................... 310/40 R
  See application file for complete search history.

(56) References Cited

U.S. PATENT DOCUMENTS

2017/0070127 A1   3/2017   Matsumoto et al.
2019/0006897 A1*  1/2019   Roh ....................... H02K 29/03

FOREIGN PATENT DOCUMENTS

| CN | 106505769 | A | 3/2017 | | |
|---|---|---|---|---|---|
| CN | 107086682 | A | 8/2017 | | |
| CN | 116760213 | A | 9/2023 | | |
| DE | 102021206596 | A1 | 12/2022 | | |
| EP | 3376641 | A1 | 9/2018 | | |
| JP | 2013158076 | * | 8/2013 | ............... | H02K 1/28 |
| JP | 2016093015 | A | 5/2016 | | |
| WO | 2015154940 | A1 | 10/2015 | | |

* cited by examiner

ELECTRIC MACHINE WITH A FIXATION OF MULTIPLE ROTOR LAMINATIONS TO A ROTOR SHAFT, SAID FIXATION ALLOWING AN AXIAL TOLERANCE COMPENSATION

CROSS-REFERENCE TO RELATED APPLICATIONS

This application is the U.S. National Phase of PCT Appln. No. PCT/DE2020/100234 filed Mar. 25, 2020, which claims priority to DE 102019113443.9 filed May 21, 2019, the entire disclosures of which are incorporated by reference herein.

TECHNICAL FIELD

The disclosure relates to an electric machine for driving a motor vehicle, such as a purely electric or hybridized motor vehicle, e.g., a car, truck, bus or other utility vehicle, having a rotor, the rotor being a central rotor shaft and a laminated core which is made up of a plurality of rotor laminations and fixed to the rotor shaft.

BACKGROUND

Generic rotors of electric machines are well known in various implementations. For example, designs are known in which a press fit is provided directly between the individual rotor laminations of the laminated core and the rotor shaft. Fixings of the laminated core by means of a nut in connection with a groove are also known. Alternatively, welded connections are also implemented.

However, these known types of fixing have the disadvantage that they usually involve a relatively high manufacturing effort. With regard to the press fits implemented between the laminated core and the rotor shaft, the rotor laminations and the corresponding receptacles are laborious to adjust in diameter and to implement solidly. In most cases, each individual rotor lamination is reshaped in a critical region. Even with the alternative mounting of a nut, at least one thread must be provided on the rotor shaft, which likewise requires complex machining Such an increased manufacturing effort also exists in the case of a welded connection that must be made using a separate process.

SUMMARY

It is therefore the object of the present disclosure to eliminate the disadvantages known from the prior art and, in particular, to provide an electric machine the rotor of which is produced simply and with sufficient strength to transmit the highest possible torques.

This is achieved according to the disclosure by the fact that the laminated core is contacted on at least one axial side by an end lamination producing tolerance compensation, which end lamination is in turn supported by a securing ring pressed onto the rotor shaft.

This fixation of the laminated core via the end lamination and the securing ring results in a fixation between the laminated core and the rotor shaft that is simple to manufacture. This is because the securing ring can easily be individually adapted to the corresponding press connection without the shape of the rotor laminations of the laminated core having to be changed. As a result, a particularly robust rotor is implemented, the manufacturing effort of which is reduced.

Further advantageous embodiments are explained in more detail below.

Accordingly, it is also advantageous if the securing ring has an axially protruding cup region, which cup region is pressed onto a radial outer side of the rotor shaft. This cup region can easily be adjusted in its axial position during assembly.

If the securing ring has a disk region which is arranged radially outside the cup region and which disk region lies flat directly on the end lamination, the further structure of the securing ring is kept simple.

It is particularly advantageous if the disk region is connected to the cup region via an axially extending connection region. As a result, the securing ring can be skillfully mounted on the rotor shaft, axially offset from the laminated core.

Furthermore, it is convenient if the securing ring is pressed onto the rotor shaft in such a way that it effects/applies an axial pretensioning force to the end lamination.

When the securing ring is pushed onto a receiving surface of the rotor shaft, the receiving surface being formed by a radial step of the rotor shaft, the diameter onto which the securing ring is pressed can be easily adjusted.

The securing ring sits on a (second) outer diameter of the rotor shaft, which (second) outer diameter is smaller than a (first) outer diameter on which the laminated core and/or the at least one end lamination sit/sits.

It is also advantageous if a first end lamination rests on a first axial side of the lamination core and a second end lamination rests on a second axial side of the lamination core opposite the first axial side. Tolerance compensation can thus be easily implemented by means of the thickness of the end laminations.

In this context, it is also advantageous if the securing ring rests on the first end lamination and the second end lamination rests (directly) on a radial shoulder of the rotor shaft. As a result, the laminated core is supported directly on the rotor shaft towards one axial side, which further favors a simple structure.

Furthermore, it has proven to be advantageous if the electric machine is designed as a synchronous motor.

If the laminated core is additionally received in a rotationally fixed manner on the radial outside of the rotor shaft via a form-fitting connection, for example a form-fitting toothing, the rotationally fixed connection of the laminated core can also be easily manufactured.

In other words, according to the disclosure, a cost-efficient axial fixation and tolerance compensation of the rotor laminations on the rotor shaft are implemented. The rotor of the electric synchronous machine (electric machine) is shaped by using individual rotor laminations which together form a rotor core (laminated core). Tolerance compensation can be set using an end lamination, which tolerance compensation in turn depends on the installation space and on varying tolerances. A locking ring/securing ring is pressed onto the rotor shaft for axially fixing/supporting the laminated core.

BRIEF DESCRIPTION OF THE DRAWINGS

In the following, the disclosure is now explained in more detail with reference to figures.

In the Figures.

DETAILED DESCRIPTION

The figures are only schematic in nature and serve only for understanding the disclosure. The same elements are provided with the same reference symbols.

Figure 1:
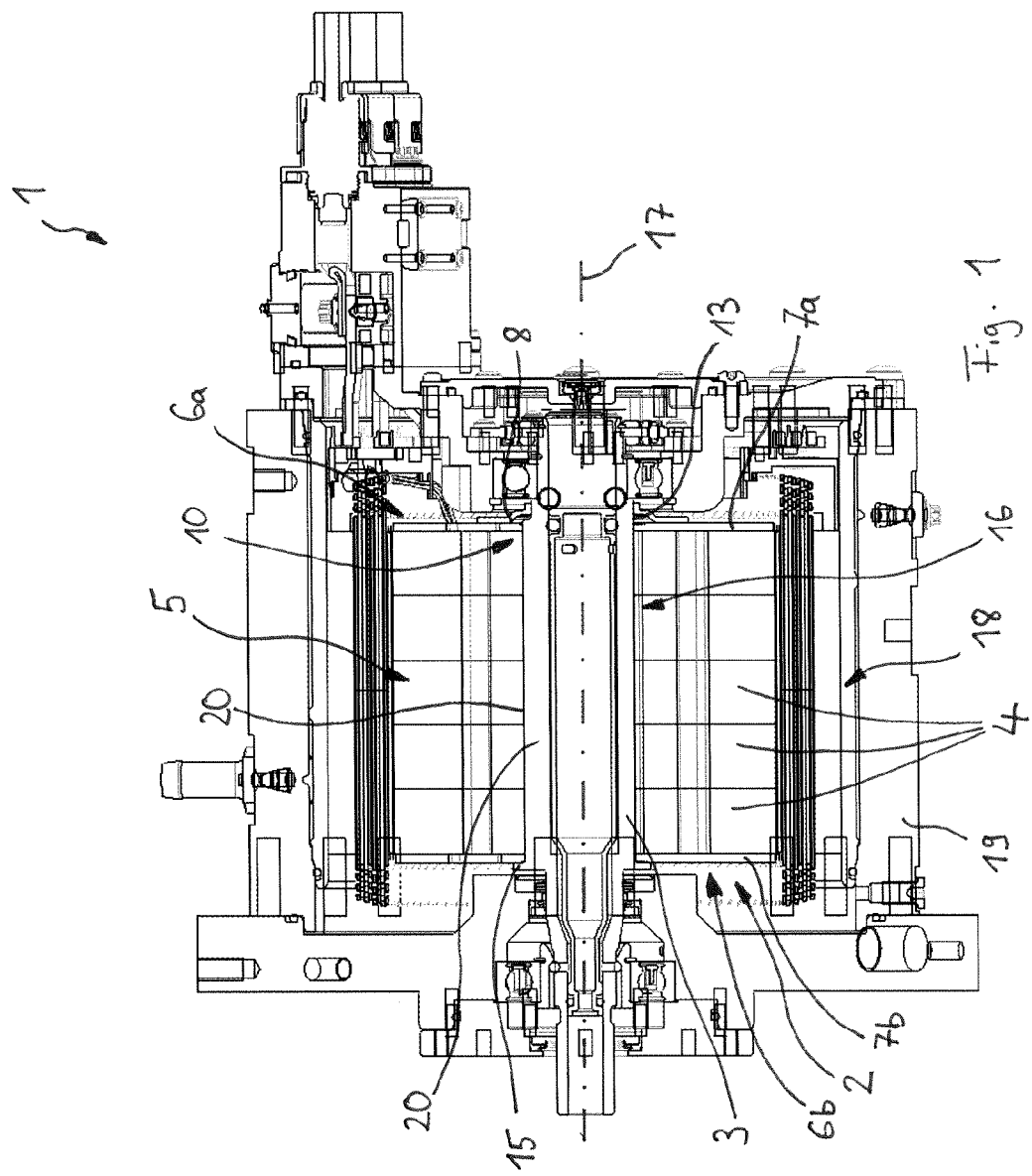
FIG. 1 shows a longitudinal sectional view of an electric machine according to the disclosure according to a preferred exemplary embodiment.

In FIG. 1 an electric machine 1 according to the disclosure can be clearly seen in its basic structure. The electric machine 1 is implemented as a synchronous machine/synchronous motor. The electric machine 1 has a rotor 2 which is arranged centrally so as to be rotatable about an axis of rotation 17. A stator 18 of the electric machine 1 is mounted radially outside the rotor 2. The stator 18 is fixedly received in a housing 19. The rotor 2 is rotatably mounted in this housing 19.

In this context, it should be pointed out that the electric machine 1 is usually dimensioned as a drive machine of a motor vehicle. The electric machine 1 is therefore preferably used in a drive train of a motor vehicle, winch is not shown here for the sake of clarity. In the present exemplary embodiment in FIG. 1, the electric machine 1 is integrated in an electric axle drive unit (E-axle). When implementing this electric axle drive unit, the motor vehicle is preferably implemented as a purely electrically driven vehicle. According to further embodiments, the electric machine 1 is also used in a hybrid module, which hybrid module is inserted in a known manner between an internal combustion engine and a transmission of the drive train and is thus prepared for implementing a hybridized drive of the motor vehicle. In further embodiments, the electric machine 1 is also used as a wheel hub machine/wheel hub motor.

Figure 2:
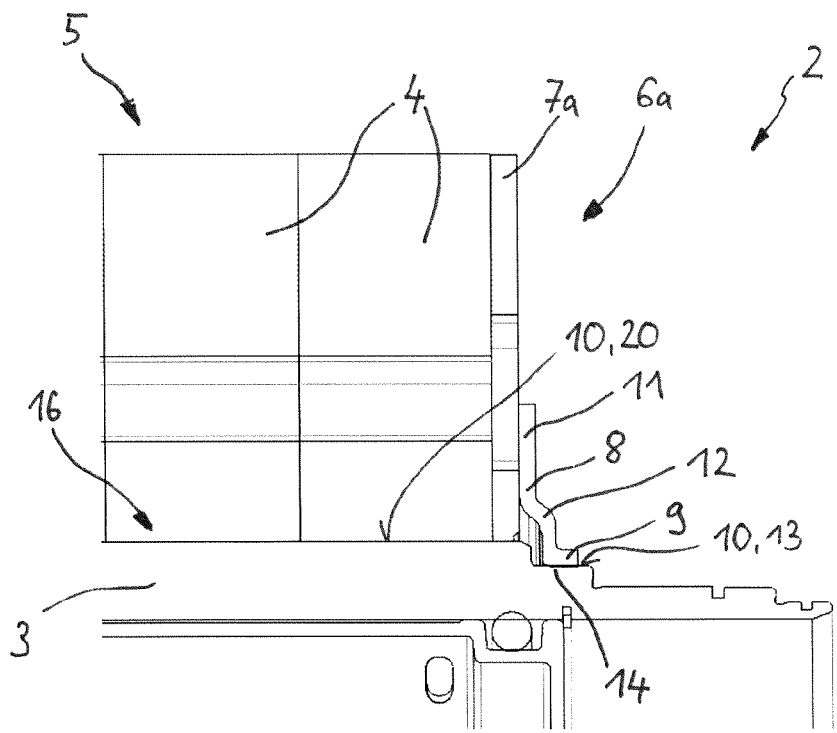
FIG. 2 shows a detailed view of the electric machine from FIG. 1 cut in the longitudinal direction, wherein a securing ring for axially supporting a rotor lamination relative to a rotor shaft can be seen in more detail.
Figure 3:
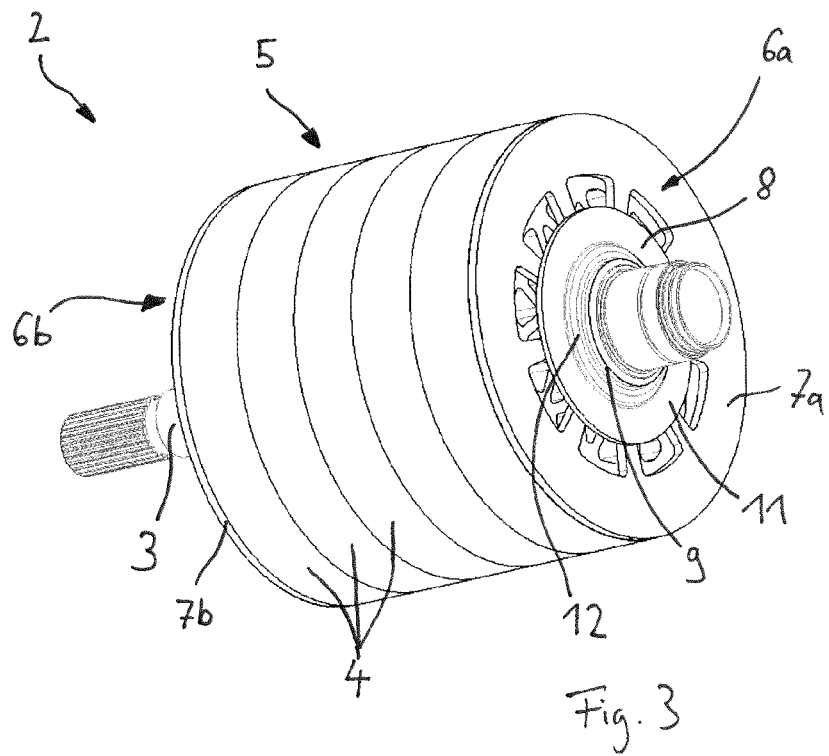
FIG. 3 shows a perspective illustration of the rotor used in FIG. 1 from a side having the securing ring.

In connection with FIGS. 2 and 3 the further structure of the rotor 2 designed according to the disclosure is shown, which can also be used separately from the illustrated electric machine 1 in other electric machines as an independent unit. The rotor 2 has a central rotor shaft 3. The rotor shaft 3 is arranged concentrically to the axis of rotation 17. The rotor shaft 3 is provided with an essentially cylindrically extending receiving region 20. A laminated core 5 of the rotor 2 is fixed to this receiving region 20 (radially from the outside). The laminated core 5 typically has a plurality of rotor laminations 4 which rest on one another in the axial direction. The rotor laminations 4 are typically implemented as identical parts. The rotor laminations 4 are already pre-assembled to form the laminated core 5. The laminated core 5 is held on the receiving region 20 in a rotationally fixed manner via a form-fitting connection 16, here in the form of a form-fitting toothing.

According to the disclosure, for axial tolerance compensation of the rotor 2, the laminated core 5 is supported on a first axial side 6a (viewed along the axis of rotation 17) by a first end lamination 7a, which first end lamination 7a is in turn directly supported by a securing ring 8 pressed onto the rotor shaft 3. This axial securing of the laminated core 5 by means of the securing ring 8 is shown in detail in FIG. 2. In connection with FIG. 3 it is also clear that the first end lamination 7a from the first axial side 6a of the laminated core 5 rests flat directly against the laminated core 5. The first end lamination 7a is also supported on the receiving region 20 and received in a rotationally fixed manner. The receiving region 20 has a constant first outer diameter over its entire length.

Figure 4:
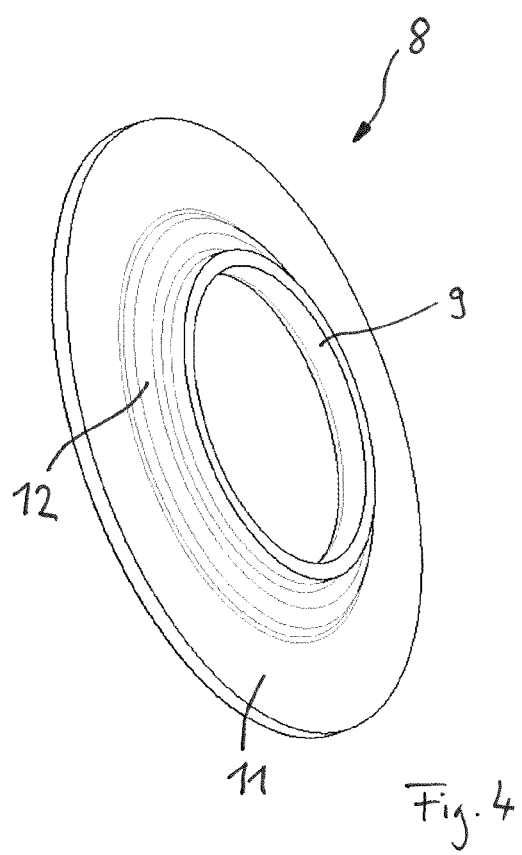
FIG. 4 shows a perspective representation of the securing ring used in FIGS. 1 to 3.

The securing ring 8 is fixed directly to the rotor shaft 3, that is to say pressed on, by means of a cup region 9 arranged radially on the inside. The axially protruding cup region 9 is pressed onto a receiving surface 13 which is formed by a radial step 14. The radial step 14 is offset inwardly in the radial direction with respect to the receiving region 20. The receiving surface 13 consequently has a second outer diameter which is smaller than the first outer diameter. The length/axial extension of the receiving surface 13 is selected to be greater than the length of the cup region 9 and is matched to the further shape of the securing ring 8 so that the position of the securing ring 8 can be varied along the receiving surface 13 during assembly. With a disk region 11 arranged radially outside of the cup region 9, the securing ring 8 rests flat directly on the first end lamination 7a. A connection region 12 connecting the disk region 11 to the cup region 9 extends in such a way that the disk region 11 is arranged offset in the axial direction with respect to the cup region 9. Due to the design of the disk region 11, the securing ring 8 is also referred to as a securing disk. The securing ring 8 can also be seen particularly clearly in FIG. 4 where it is illustrated separately. It will be clear here that the connection region 12 is essentially implemented as an axial bulge. The securing ring 8, like the first end lamination 7a, is made from a metal sheet (steel).

A second end lamination 7b is arranged on a second axial side 6b of the laminated core 5 facing away from the first axial side 6a. The second end lamination 7b also rests flat against the laminated core 5 on the second axial side 6b. On a side of the second end lamination 7b again facing axially away from the laminated core 5, the second end lamination 7b is supported directly on a shoulder 15 of the rotor shaft 3 projecting radially outward (FIG. 1). The shoulder 15 is integrally formed with the rotor shaft 3. This results in an axial reception of the laminated core 5 together with the end laminations 7a, 7b between the shoulder 15 and the securing ring 8.

It should also be pointed out that the securing ring 8 is preferably pressed onto the rotor shaft 3 with an axial pretensioning force, so that the first end lamination 7a presses on the laminated core 5 with an axial pretensioning force and the laminated core 5 in turn presses the second end lamination 7b against the shoulder 15 with an axial pretensioning force.

In other words, the embodiment according to the disclosure provides a cost-efficient and compact solution in terms of installation space for fixing the rotor laminations 4 to the rotor shaft 3. This solution offers a simple and inexpensive fixation option. In addition, this solution offers a high degree of flexibility and can be installed in many different electric machines 1, which differ either in terms of the active length (power) and/or the transmission interface. The inventive solution therefore also consists of an inexpensive, simple and modular-compatible technical solution. The tolerance compensation is effected by the end lamination (first end lamination 7a), which can be adapted dependent on the installation space and for the tolerance compensation. The axial fixation is effected with the axial securing ring 8, which is pressed onto the rotor shaft 3. Thus, the rotor laminations 4 and the end laminations 7a, 7b are held in position. A preferred installation variant takes place in an e-axle.

LIST OF REFERENCE NUMBERS

1 Electric machine
2 Rotor

3 Rotor shaft
4 Rotor lamination
5 Laminated core
6a First axial side
6b Second axial side
7a First end lamination
7b Second end lamination
8 Securing ring
9 Cup region
10 Outer side
11 Disk region
12 Connection region
13 Receiving surface
14 Step
15 Shoulder
16 Form-fitting connection
17 Axis of rotation
18 Stator
19 Housing
20 Receiving region

The invention claimed is:

1. An electric machine for driving a motor vehicle, the electric machine comprising:
a rotor comprising a central rotor shaft and a laminated core which is made of multiple rotor laminations and is fixed to the rotor shaft,
wherein the laminated core is contacted on at least one axial side by an end lamination which produces a tolerance compensation, said end lamination being supported in turn by a securing ring pressed onto the rotor shaft, and
wherein the securing ring has an axially protruding cup region which is pressed onto a radial outer side of the rotor shaft, a radially inner surface of the axially protruding cup region being parallel to a central axis of the rotor shaft, and the radially inner surface of the axially protruding cup region contacting the rotor shaft continuously from a first axial end to a second axial end of the axially protruding cup region; and
wherein a first end lamination rests against a first axial side of the laminated core and a second end lamination rests against a second axial side of the laminated core, opposite the first axial side, and the securing ring rests on the first end lamination and the second end lamination rests on a radial shoulder of the rotor shaft.

2. The electric machine according to claim 1, wherein the securing ring has a disk region which is arranged radially outside the cup region and the disk region lies flat directly on the end lamination.

3. The electric machine according to claim 2, wherein the disk region is connected to the cup region via an axially extending connection region.

4. The electric machine according to claim 1, wherein the securing ring is pressed onto the rotor shaft in such a way that it effects an axial pretensioning force on the end lamination.

5. The electric machine according to claim 1, wherein the securing ring is pushed onto a receiving surface of the rotor shaft, wherein the receiving surface is formed by a radial step of the rotor shaft.

6. The electric machine according to claim 1, wherein the electric machine is designed as a synchronous motor.

7. The electric machine according to claim 1, wherein the laminated core is received in a rotationally fixed manner on a radial outer side of the rotor shaft via a form-fitting connection.

8. An electric machine for driving a motor vehicle, the electric machine comprising:
a rotor comprising:
a rotor shaft having a central axis of rotation;
a laminated core coupled to the rotor shaft, the laminated core comprising multiple rotor laminations;
an end lamination contacting at least one axial side of the laminated core, the end lamination being configured to produce a tolerance compensation; and
a securing ring positioned axially outside the end lamination and pressed onto the rotor shaft, such that the end lamination is positioned between the securing ring and the laminated core, and the securing ring is configured to support the end lamination against the laminated core;
wherein the securing ring comprises an axially protruding cup region and a disk region arranged radially outside the cup region, the disk region having an axially inner surface that is perpendicular to the central axis of rotation and lies flat directly on the end lamination, and the disk region is connected to the cup region via an axially extending connection region.

9. The electric machine according to claim 8, wherein the disk region lies flat directly on the end lamination from a radially inner portion of the disk region to a radially outer portion of the disk region.

10. The electric machine according to claim 8, wherein a radially inner portion of the disk region is radially offset from a radially outer surface of the rotor shaft.

11. An electric machine for driving a motor vehicle, the electric machine comprising:
a rotor comprising:
a rotor shaft having a central axis of rotation;
a laminated core coupled to the rotor shaft, the laminated core comprising multiple rotor laminations;
an end lamination contacting at least one axial side of the laminated core, the end lamination being configured to produce a tolerance compensation; and
a securing ring positioned axially outside the end lamination and pressed onto the rotor shaft, such that the end lamination is positioned between the securing ring and the laminated core, and the securing ring is configured to support the end lamination against the laminated core;
wherein a radially innermost surface of the securing ring is pressed onto a receiving surface of the rotor shaft, the receiving surface is formed by a radial step of the rotor shaft, and the radially innermost surface and the receiving surface are parallel with the central axis of the rotor shaft;
wherein a first end lamination rests against a first axial side of the laminated core and a second end lamination rests against a second axial side of the laminated core, opposite the first axial side, and the securing ring rests on the first end lamination and the second end lamination rests on a radial shoulder of the rotor shaft.

12. The electric machine according to claim 11, wherein the receiving surface has a smaller diameter than a portion of the rotor shaft comprising the laminated core.

13. The electric machine according to claim 11, wherein the securing ring comprises an axially protruding cup region pressed onto a radial outer side of the receiving surface.

14. The electric machine according to claim 13, wherein an axial length of the cup region is less than an axial length of the receiving surface.

* * * * *